(12) United States Patent
Fujii et al.

(10) Patent No.: US 7,695,652 B2
(45) Date of Patent: Apr. 13, 2010

(54) OPTICAL WAVEGUIDE AND METHOD FOR MANUFACTURING THE SAME

(75) Inventors: Akira Fujii, Kanagawa (JP); Toshihiko Suzuki, Kanagawa (JP); Keishi Shimizu, Kanagawa (JP); Kazutoshi Yatsuda, Kanagawa (JP); Masahiro Igusa, Kanagawa (JP); Shigemi Ohtsu, Kanagawa (JP); Eiichi Akutsu, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 4 days.

(21) Appl. No.: 12/172,564

(22) Filed: Jul. 14, 2008

(65) Prior Publication Data

US 2009/0103873 A1 Apr. 23, 2009

(30) Foreign Application Priority Data

Oct. 23, 2007 (JP) ............................. 2007-275196

(51) Int. Cl.
- *G02B 6/00* (2006.01)
- *G02B 6/10* (2006.01)
- *G01R 31/26* (2006.01)
- *H01L 21/00* (2006.01)
- *B44C 1/17* (2006.01)
- *B32B 38/14* (2006.01)

(52) U.S. Cl. .................... 264/1.24; 264/271.1; 264/152; 264/163; 264/277; 264/278; 438/33; 438/68; 438/113; 438/114; 438/464; 156/241; 156/250; 385/132

(58) Field of Classification Search ....................... None
See application file for complete search history.

(56) References Cited

U.S. PATENT DOCUMENTS

| 6,319,754 B1 * | 11/2001 | Wang et al. ................. 438/113 |
| 6,858,518 B2 * | 2/2005 | Kondo ......................... 438/458 |
| 7,163,598 B2 * | 1/2007 | Okubora et al. ............. 156/249 |
| 7,306,689 B2 * | 12/2007 | Okubora et al. ............. 156/239 |
| 2007/0114684 A1 * | 5/2007 | Ohtsu et al. ................. 264/1.24 |

FOREIGN PATENT DOCUMENTS

| JP | 8-286064 A | 11/1996 |
| JP | 9-222524 A | 8/1997 |
| JP | 9-230155 A | 9/1997 |

* cited by examiner

*Primary Examiner*—Christina Johnson
*Assistant Examiner*—Benjamin Schiffman
(74) *Attorney, Agent, or Firm*—Sughrue Mion, PLLC

(57) ABSTRACT

An optical waveguide includes a layer A and a plurality of cores enclosed in a cladding. During production of the optical waveguide, a layered film including alternate layers of a core layer and a cladding layer is cut so as to form a groove that penetrates through the layered film in a thickness direction and so as to form a plurality of core portions, and the layer A is provided so as to partially fill the groove depthwise and so as to maintain spacing between the plurality of core portions before the core portions is enclosed by the cladding.

10 Claims, 4 Drawing Sheets

OPTICAL WAVEGUIDE AND METHOD FOR MANUFACTURING THE SAME

CROSS-REFERENCE TO RELATED APPLICATIONS

This application is based on and claims priority under 35 USC 119 from Japanese Patent Application No. 2007-275196 filed on Oct. 23, 2007.

BACKGROUND

1. Technical Field

The present invention relates to an optical waveguide and a method for manufacturing the same.

2. Related Art

The technology of high speed transmission of signals using electricity is approaching its limit because of crosstalk, high power consumption, high loss and the like, and therefore, there are great expectations in the role of optical transmission. A long-distance optical transmission has been standardized by means of a single-mode quartz-based optical fiber from the viewpoint of low-loss characteristics, high reliability and the like, while in a short-distance optical transmission, transmission using electricity has been principally carried out from the viewpoint of costs for connection or difficulty of handling, thereby causing a bottle neck.

In these situations, it has been expected that a multi-mode polymeric optical waveguide might be applied to the short-distance optical transmission from the viewpoint of low costs, easy handling such as simple and easy connection, and high flexibility, although the above-described optical waveguide provides a slightly larger optical power loss compared to the quartz-based optical fiber.

Several methods of manufacturing a multi-mode polymeric optical waveguide have been proposed as described below.

(1) A method in which a film is impregnated with a monomer, a core part is selectively exposed to UV ray to change its refractive index and the film is then attached to another material (a selective polymerization method).

(2) A method in which a core layer and a cladding layer are applied and then a cladding part is formed by using reactive ion etching (an RIE method).

(3) A method in which an ultraviolet ray-curable resin obtained by adding a photosensitive material into a polymer material is exposed and developed by photolithography (a direct exposure method).

(4) A method using injection molding.

(5) A method in which a core layer and a cladding layer are applied and then a core part is exposed to UV ray to change the refractive index of the core part (a photo-bleaching method).

(6) A method using a silicon rubber mold.

SUMMARY

According to an aspect of the invention, there is provided an optical waveguide including a layer A and a plurality of cores enclosed in a cladding, wherein, during production of the optical waveguide, a layered film including alternate layers of a core layer and a cladding layer is cut so as to form a groove that penetrates through the layered film in a thickness direction and so as to form a plurality of core portions, and the layer A is provided so as to partially fill the groove depthwise and so as to maintain spacing between the plurality of core portions before the core portions is enclosed by the cladding.

BRIEF DESCRIPTION OF THE DRAWINGS

Exemplary embodiments of the present invention will be described in detail based on the following figures, wherein.

DETAILED DESCRIPTION

Figure 1:
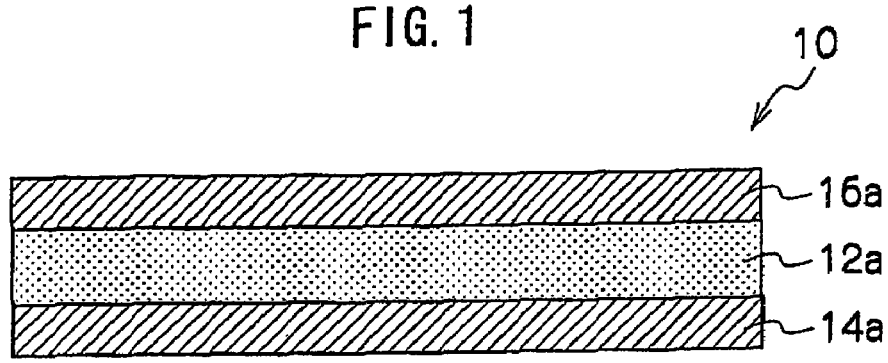
FIG. 1 is a schematic diagram showing a three-layered film used for manufacturing an optical waveguide according to a first exemplary embodiment.

Exemplary embodiments of the present invention will be hereinafter described with reference to the attached drawings. Note that the same reference character is assigned to members having substantially the same function and operation throughout the drawings, and overlapping descriptions will be omitted in some cases.

First Exemplary Embodiment

Figure 5:
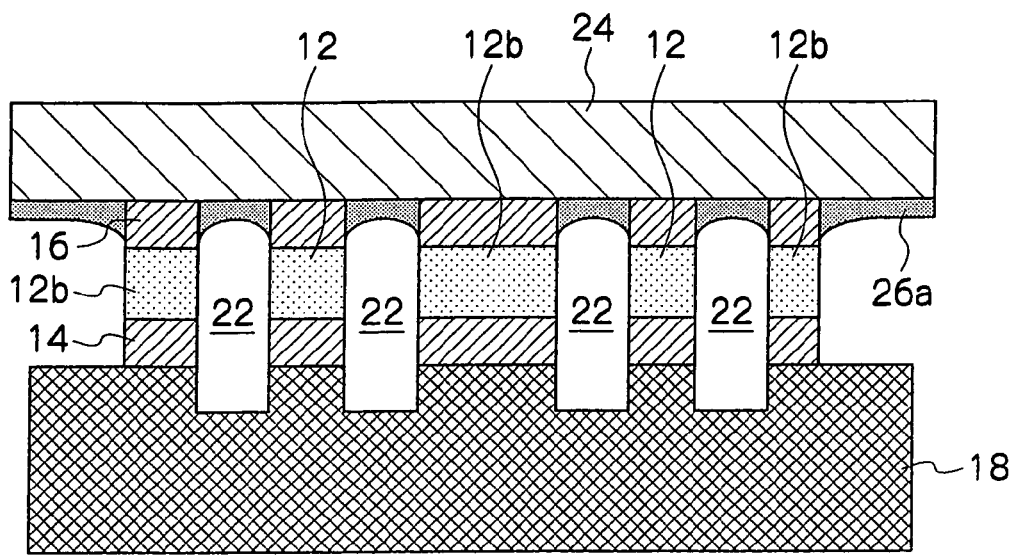
FIG. 5 is a schematic diagram showing a state in which a curable resin layer of a transfer base material is attached to the three-layered film after the layered film has been cut.
Figure 6:
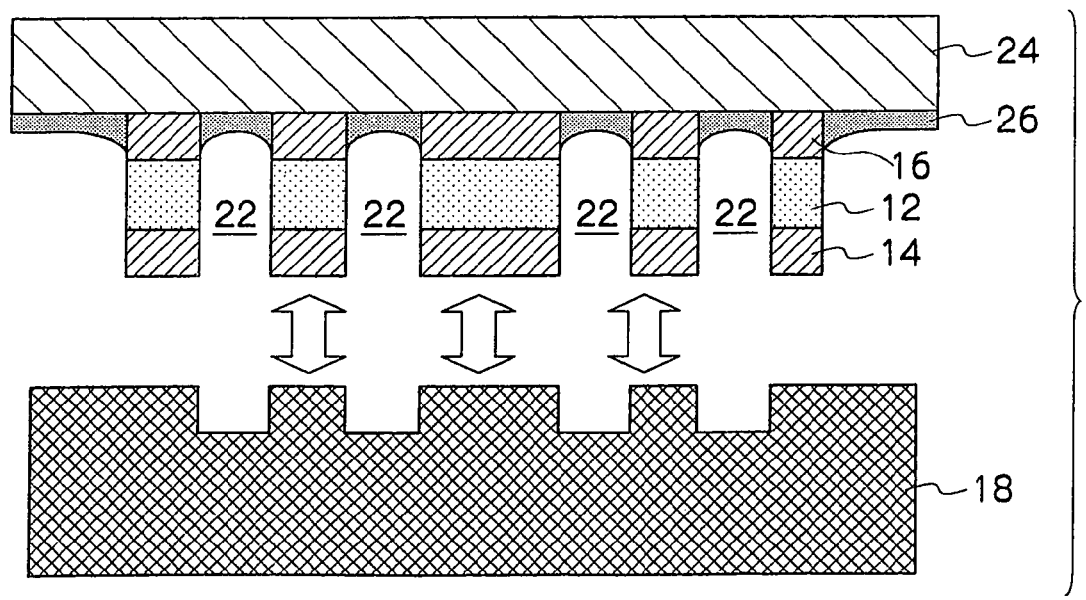
FIG. 6 is a schematic diagram showing a state in which the dicing tape is detached with the core spacing being maintained by the resin layer that has been cured.
Figure 7:
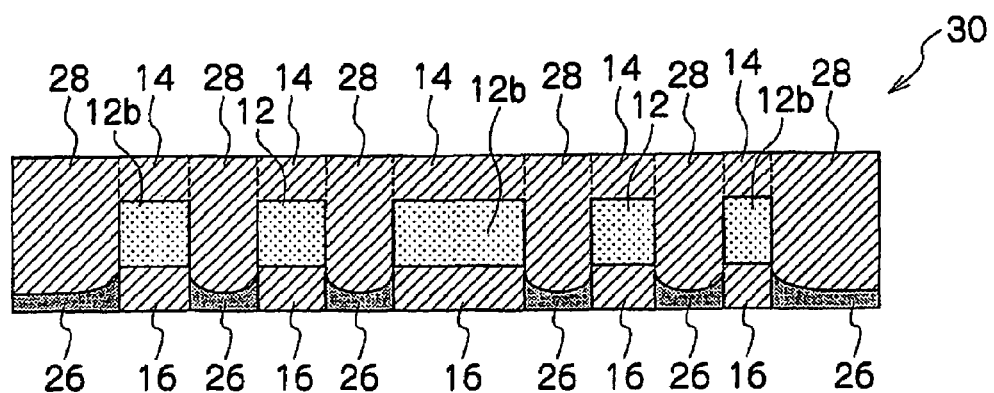
FIG. 7 is a schematic diagram showing a cross section of the optical waveguide according to the first exemplary embodiment.

FIGS. 1 to 7 schematically show the process of manufacturing an optical waveguide according to the first exemplary embodiment. The optical waveguide 30 of the exemplary embodiment shown in FIG. 7 is an array type optical waveguide in which plural cores 12 and plural dummy cores 12b are enclosed by cladding 14, 16 and 28, and includes plural cores 12, plural dummy cores 12b, cladding 14, 16 and 28 that encloses the plural cores 12 and dummy cores 12b, and a layer 26 that is formed so as to maintain spacing of the plural cores 12 and dummy cores 12b, which are separated from one another during the production process. Specifically, when the optical waveguide 30 is manufactured, a layered film including a core layer and cladding layers disposed alternately is cut in the direction of thickness thereof so as to form grooves that penetrate through the layered film in the thickness direction and plural core portions 12. Before the plural core portions 12 is enclosed by a cladding 28, the layer 26 fills upper part of the groove, and maintains the intervals between the plural core portions 12 and dummy cores 12b. The dummy core 12b mentioned herein means an independent portion 12b which has been formed by cutting out the core layer 12a in a core forming process of the present optical waveguide 30, which is able to form a core (a light propagation portion) enclosed by cladding 28 and 14 having a lower refractive index than that of the portion 12b, and which is not used as the light propagation portion in the final product. Of course, depending on the type of usage thereof, the dummy core 12b can also be used as the light propagation portion, that is, a core.

A method for manufacturing the optical waveguide 30 of the present exemplary embodiment will be hereinafter described in a concrete manner.

The method for manufacturing the optical waveguide 30 of the present exemplary embodiment mainly includes: forming plural core portions by cutting into a layered film including alternate layers of a core layer and a cladding layer in the direction of the thickness of the layered film; and enclosing the plural core portion with a cladding while maintaining the spacing of the plural core portions.

As shown in FIG. 1, a three-layered film 10 having a first layer (a lower cladding layer) 14a that will form a lower cladding 14, a second layer (a core layer) 12a that will form a core 12, and a third layer (an upper cladding layer) 16a that will form an upper cladding 16 is prepared. The material that forms the second layer (core layer) 12a is not particularly limited as long as (i) it is transparent to light having a wavelength to be used, (ii) the refractive index of the core 12 is higher than that of the cladding 14 and 16, and (iii) there is a desired difference in the refractive indexes between the core 12 and cladding 14, 16. For example, an alicyclic olefin resin, acrylic resin, an epoxy resin, a polyimide resin and the like may be used to provide the core layer 12a, and cladding layers 14a and 16a. Incidentally, these cladding layers 14a and 16a are usually made of the same material, but these cladding layers may be made of respectively different materials having lower refractive indexes than the core layer 12a.

Respective thicknesses of the core layer 12a and cladding layers 14a and 16a are determined in consideration of various factors such as an optical system connected to the produced optical waveguide 30, coupling loss, and flexibility of the optical waveguide 30. If the flexibility, in particular, is taken into consideration, the thicknesses of the upper and lower cladding layers 14a and 16a may be as small as possible; specifically, the thickness of each of the upper and lower cladding layers is preferably 30 μm or less (or about 30 μm or less), and more preferably 20 μm or less.

Further, the total thickness of the layered film 10 is preferably from 70 μm to 150 μm (or about 70 μm to about 150 μm), more preferably from 60 μm to 100 μm, and particularly preferably from 50 μm to 80 μm, in consideration of flexibility and the like.

(A) Cutting

The above-described layered film 10 is cut through in the thickness direction thereof to form plural core parts 12 and dummy cores 12b.

Figure 2:
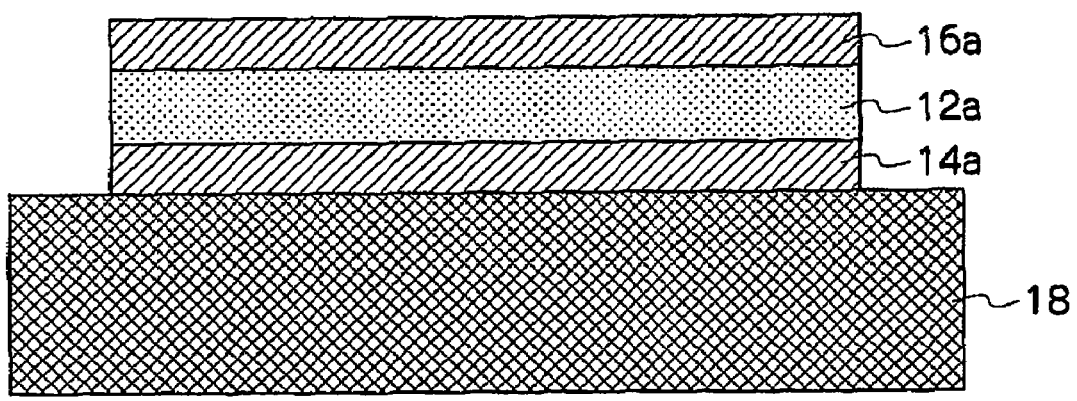
FIG. 2 is a schematic diagram showing a state in which the three-layered film is attached to a dicing tape.

Specifically, as shown in FIG. 2, the layered film 10 having the core layer 12a and the cladding layers 14a and 16a, which are alternately disposed, is temporarily affixed by attaching one side of the layered film 10 to a cutting base material 18, for example, an UV-peelable dicing tape. The cutting base film 18 used to affix the layered film 10 when the film is cut is not limited to the UV-peelable dicing tape. Any base film may be selected so long as (i) the base material can affix the layered film 10 at an original position when the layered film 10 is cut and (ii) and the base film can be peeled off after cutting.

Figure 3:
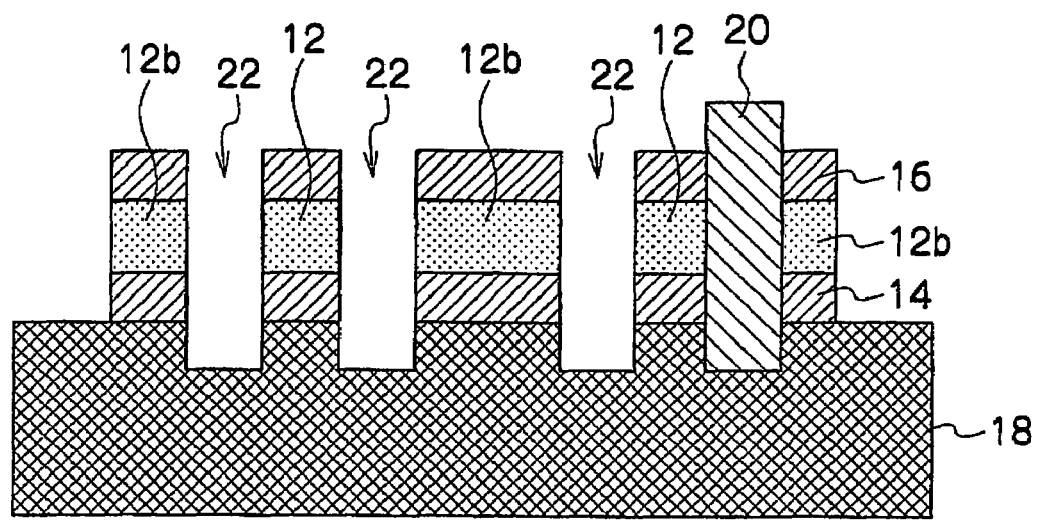
FIG. 3 is a schematic diagram showing a state in which the three-layered film is cut (subjected to full-cut processing).

Next, as shown in FIG. 3, a dicing blade 20 cuts the layered film 10 in the direction of thickness of the layered film 10 so that the dicing blade 20 penetrates through the layered film 10 from the surface of the layered film 10 opposite to the surface to which the dicing tape 18 is attached (i.e., the upper cladding layer 16a side) (full-cut processing), but does not penetrate through the dicing tape 18. For example, the dicing blade 20 is set at a height that allows cutting of a portion of the dicing tape 18, so as to form a groove 22. The number and width of the grooves 22 to be formed by cutting may be determined depending on applications of the optical waveguide 30 to be manufactured. Plural core parts 12 and dummy cores 12b are formed as a result of formation of a predetermined number of grooves 22 at predetermined pitches by full-cut processing of the layered film 10. On the other hand, since the dicing tape is not completely cut through, the layered film 10 in a full-cut state is affixed to the dicing tape 18 in such a state that the layered film 10 is divided into independent parts by the cut grooves 22 interposed between the independent parts.

(B) Attaching

Next, an uncured curable resin layer 26a (hereinafter also referred to as "curable resin material 26a") provided on a transfer base material 24 is attached to the surface of the layered film 10 opposite to the surface affixed to the dicing tape 18.

Figure 4:
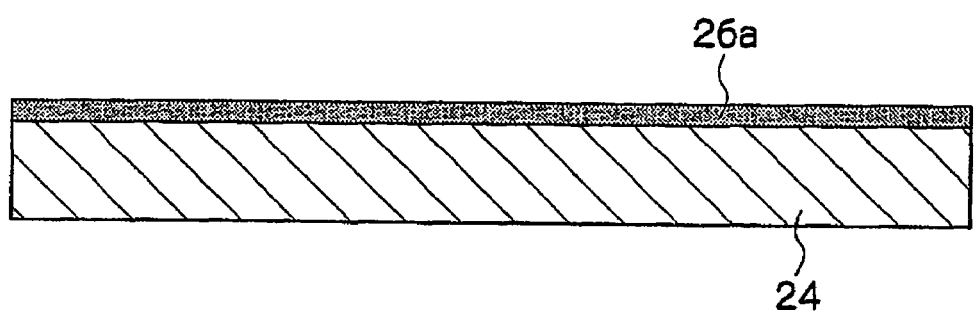
FIG. 4 is a schematic diagram showing a transfer base material provided with a curable resin layer.

FIG. 4 shows the transfer base material 24 provided with the uncured curable resin layer 26a. As the transfer base material 24, a plate-shaped material such as plate-shaped resin, glass or metal may be used. Usually, a transparent resin film made of a resin such as polyethylene terephthalate (PET) is used.

The thickness of the transfer base material 24 is not particularly limited as long as the transfer base material is maintained in the plate shape and allows formation of the curable resin layer 26a. For example, when the transfer base material is retained as a protective member of the optical waveguide so as to improve an environmental resistance, in consideration of the function as the protective member or formation of a thin film, the thickness of the transfer base material 24 is preferably 10 to 200 μm (or about 10 μm to about 200 μm), more preferably 10 to 100 μm, and particularly preferably 10 to 70 μm, though an appropriate thickness varies depending on the kind of the material.

The material that forms the curable resin layer 26a on the transfer base material 24, the viscosity thereof, and the film thickness of the curable resin layer are each appropriately determined such that when the curable resin layer is attached to the layered film 10 by the after-mentioned attaching, the curable resin flows to an appropriate degree into the grooves 22 formed in the layered film 10, and curing of the resin allows the resin to connect the separated parts of the layered film 10, thereby making it possible to maintain core spacing. Examples of usable curable materials include UV-curable materials and thermosetting materials. A UV-curable material may be selected from the standpoint of simplification of the process and prevention of thermal deformation of the layered film 10 or transfer base material 24. Specific examples of the curable resin material include, but are not limited to, acrylic resin materials and epoxy resin material.

The method of forming an uncured curable resin layer 26a on the transfer base material 24 is not particularly limited. For example, a spin coating method, a dip coating method and other known methods can be used. In consideration of homogeneity of film thickness, simplification and the like, it is preferable to select the spin coating method.

The thickness of the curable resin layer 26a on the transfer base material 24 may be determined in consideration of the thickness of the upper cladding layer 16a to be attached to the curable resin layer, required flexibility, and the like. In order to reliably maintain the core spacing after curing while preventing entry of the resin deeper into the cutting groove 22 than necessary, the film thickness is preferably from 5 μm to 20 μm, and more preferably from 5 μm to 10 μm. For example, the thickness of the curable resin layer is preferably 10 μm (or about 10 μm) or less.

With regard to the viscosity of the curable resin material, if the film 26a is formed by a curable resin material that already has a high viscosity, the film formed on the transfer base material 24, without further processing, may be attached to the layered film 10. On the other hand, it is also effective to form an uncured film 26 on the transfer base film 24 by using a material having a low viscosity so as to making the coating process easier, and then incompletely cure the film 26 (to make the film incompletely-cured) before boding so as to adjust the viscosity. The "incompletely-cured" mentioned herein refers to a state in which partial curing reaction, and/or a evaporation of the solvent, has occurred, and the incompletely-cured state has a higher viscosity than the viscosity immediately after the curable material is applied on the transfer base material 24.

Incompletely-curing of the curable resin layer is achieved by carrying out curing process under milder conditions than the conditions for complete curing. The conditions for incompletely-curing of the curable resin layer may be selected according to the kind of curable resin material to be used. For example, the incomplete-curing conditions may be obtained by at least one of reducing an applied energy (for example, ultraviolet rays, electronic beam, heat) for curing enhancement, shortening the processing time, or the like. When a UV-curable resin is used, the resin can be incompletely-cured by irradiation with UV rays at an irradiation intensity and an irradiation time that are insufficient for the complete curing conditions. Alternatively, it is possible and effective to select a radical-based polymer material (for example, acrylic resin), which is a polymer material whose curing reaction is inhibited by oxygen, and cure the polymer material in an atmosphere containing oxygen so as to achieve a incompletely-cured state of the material due to oxygen inhibition. In addition, it is also possible to cure the resin layer incompletely by, after formation of the resin layer, leaving the resin layer in an atmosphere for a certain period of time.

As shown in FIG. 5, the transfer base material 24 is attached to the layered film 10 with the uncured curable resin layer 26a disposed therebetween. When the uncured thin film 26a made of the curable resin material faces, and is attached under a certain pressure, to the upper cladding layer 16a of the layered film 10, the uncured curable resin material 26a is inserted into the grooves 22 of the layered film 10 to a certain depth. At this time, if the curable resin material 26a is so inserted as to reach the bottom of the grooves 22 of the layered film 10, it may be difficult to peel the dicing tape 18 after curing, irregularities may be formed on the surface of the optical waveguide, and further the optical characteristics may be adversely affected when the curable resin material 26a is not able to form a cladding material.

Accordingly, the material and viscosity of the curable resin material 26a, and incomplete cure processing and the like may be suitably selected such that the curable resin material 26a is inserted into only a part of the groove portion that is formed by the absence of the upper cladding layer 16a. If the curable resin layer 26a in an incompletely cured state provided on the transfer base material 24 is attached to the layered film 10, the curable resin that forms the film 26a is prevented from entering into the groove 22 of the layered film 10 more than necessary and affecting on the optical characteristics, so that the yield may be improved. However, when the curable resin layer 26a is made of a material that can function as a cladding, there is no problem associated with entry of the curable resin material 26a into a part of the groove that is formed by the absence of the core layer 12a, or further into a part of the groove that is formed by the absence of the lower cladding layer 14a.

(C) Transferring

Next, the curable resin layer 26 is cured to maintain the spacing between the plural core portions 12, and the cut layered film 10 is released from the dicing tape 18 with the spacing between the plural core portions 12 maintained, so that transferring of the layered film 10 to the transfer base material 24 is completed.

For example, when the material that forms the curable resin layer 26a is of a UV curable type and the dicing tape 18 is of a UV peelable type, ultraviolet rays may be irradiated from the upper cladding 16 side or from the lower cladding 14 side, or if necessary, from both of the upper and lower sides, so that the curable resin layer 26a is cured and is separated from the dicing tape 18. The curable resin material 26a on the transfer base material 24 may be cured by irradiation with ultraviolet rays in the state that the curable resin material 26a partially fills the groove 22 depthwise, so that the curable resin material 26a is integrated with the layered film 10. As shown in FIG. 6, the layered film 10 is transferred to the transfer base material 24 with the spacing between the plural core portions 12 maintained.

Incidentally, if the adhesive force of the transfer base material 24 and the curable resin layer 26a is small, the curable resin layer 26a can be cured and the transfer base material 24 can be peeled off, by irradiation with ultraviolet rays. At this time, the full-cut layered film 10 is attached to the cured resin layer 26 that partially fills each of the grooves 22 depthwise, so that the layered film 10 is integrated with the resin layer 26. Therefore, the spacing between the core portions 12 is maintained precisely, and separation of the transfer base material 24 increases flexibility. When the transfer base material 24 is designed to remain with the optical waveguide, a material may be selected which makes it difficult to peel off the transfer base material 24 even after the curable resin layer 26a is cured. Accordingly, the curable resin material 26a and the transfer base material 24 each may be selected in accordance with the applications of the finally obtained optical waveguide 30, for example in consideration of factors such as heat resistance, flame retardancy, strength, and moisture resistance.

(D) Forming Enclosed Cladding

Next, the plural core portions 12 and dummy cores 12b arranged at intervals that are maintained by the curable resin layer 26 are each enclosed by the cladding 28.

Specifically, the grooves 22 formed in the layered film 10 are each filled with the cladding material 28, and if necessary, the dummy core portions 12b disposed at both sides of each core portion 12 are also enclosed by the cladding 14, 16 and 28; then the cladding material is cured. The cladding (filler cladding) 28 to be filled in the grooves 22 is a material having a lower refractive index than that of the core portions 12. Usually, as the cladding 28, the same material as that of the upper and lower cladding 14 and 16 is used. In such a way, when the cladding material 28 is filled in the grooves 22, the spacing between the core portions 12 and the dummy cores 12b is maintained due to presence of the curable resin layer 26 that is configured to partially fill the groove 22 depthwise.

By providing the filler cladding 28, the plural cores 12 and dummy cores 12b as shown in FIG. 7 are enclosed in the cladding 14, 16 and 28. In addition to the filler cladding 28, a layer 26 formed so as to maintain the intervals of the cores is inserted at a position corresponding to the interval between the core portions 12 (in a portion of the groove), and thus, the optical waveguide 30 is obtained.

Second Exemplary Embodiment

Figure 8:
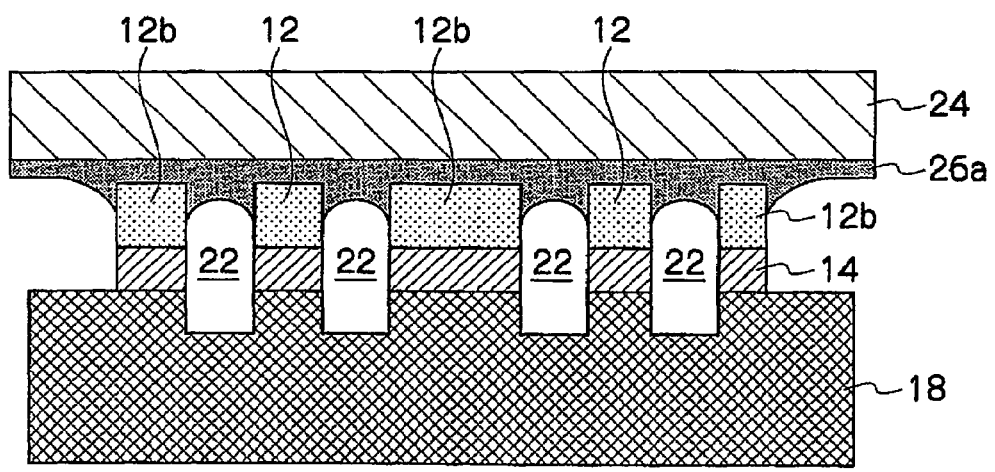
FIG. 8 is a schematic diagram showing a state in which a curable resin layer of a transfer base material is attached to a two-layered film that has been cut.
Figure 9:
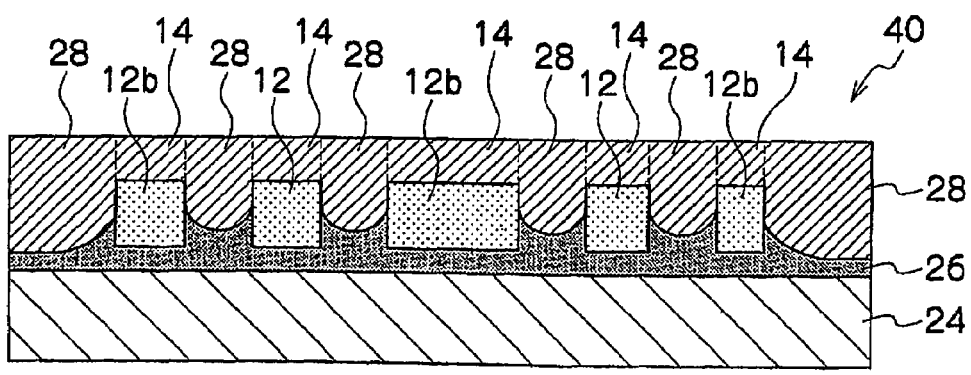
FIG. 9 is a schematic diagram showing an optical waveguide according to a second exemplary embodiment.

FIG. 8 shows a part of the process of manufacturing an optical waveguide according to a second exemplary embodiment, and FIG. 9 shows an optical waveguide according to the second exemplary embodiment.

First, a layered film having one core layer and one cladding is prepared, the cladding-layer side of the layered film is attached to the dicing tape 18. Subsequently, a cutting operation from the core layer side is conducted at predetermined pitches with a dicing blade 20 so that the dicing blade 20 penetrates through the layered film but does not penetrate through the dicing tape 18, thereby forming grooves. As a result, plural core portions 12 and dummy cores 12b are formed in the layered film.

On the other hand, the transfer base material 24 provided with an uncured layer 26a of the curable resin material on one side thereof is prepared. Since the curable resin material will become a part of a cladding that encloses the core 12, cladding material having a lower refractive index than that of the core 12 is selected.

As shown in FIG. 8, the transfer base material 24 provided with the uncured curable resin layer 26a is attached to a surface of the layered film (12, 14) with the curable resin layer 26a disposed between the transfer base material 24 and the layered film. The surface of the layered film to which the transfer base material 24 is attached is at a side (the core 12 side) opposite to the side (the cladding 14 side) that is affixed to the dicing tape 18. At this time, as shown in FIG. 8, the attaching is conducted at such a pressure that not all of the uncured resin material 26a provided on the transfer base material 24 flows into the grooves 22, but a part of the resin material 26a remains on the core portions 12; the curable resin material 26a is then cured. As a method of preventing the uncured resin material 26a from entirely flowing into the grooves 22, it is effective to select a polymer material having a high viscosity. Further, it is also effective to conduct the above-described incomplete curing after the formation of the uncured thin film 26a but before the attaching.

After the attaching, the uncured resin material 26a is cured by irradiation of ultraviolet rays. Thereby, the layered film (12, 14) is separated from the dicing tape 18 with the spacing between the plural core portions 12 maintained by the cured resin layer 26 that partially fills the cut grooves 22 depthwise, so that transfer of the layered film to the transfer base material 24 is achieved.

Subsequently, the cladding material 28 is supplied from the cladding 14 side, so that the plural core portions 12 are enclosed due to the supply of the cladding material 28, the spacing of the core portions 12 being maintained by the cured resin layer 26; then the cladding material 28 is cured. As a result, as shown in FIG. 9, an optical waveguide 40 in which each core 12 and dummy core 12b are enclosed in the cladding 14, 26 and 28 can be obtained. In this case as well, if necessary, the transfer base material 24 may be retained so that it functions as a protective member and imparts environmental resistance.

Also when a two-layer layered film including one core layer and one cladding layer is used as described above, an inexpensive array type optical waveguide 40 with flexibility and a high precision of core spacing can be obtained due to formation of the layer 26 for maintaining core spacing by using the cladding material after the full cutting. Further, in the method for manufacturing the optical waveguide 40 according to the second exemplary embodiment as described above, the number of steps for preparing the layered film is smaller than that of the method for manufacturing the optical waveguide 30 according to the first exemplary embodiment, and the upper cladding and filler cladding may be formed in the same step.

EXAMPLES

The present invention will be specifically described by way of examples. However, the examples should not be construed as limiting the invention.

Example 1

A three-layer polymer film of 11 cm×11 cm is prepared in which a layer serving as a core and having a higher refractive index (UV-curable epoxy material; refractive index: 1.56) is sandwiched with layers serving as cladding and having a lower refractive index (UV-curable epoxy material; refractive index: 1.51) so as to achieve a numerical aperture (NA) of 0.4. The film thicknesses of the upper cladding layer, the core layer and the lower cladding layer are respectively 10 μm, 50 μm and 10 μm. The lower cladding layer side of the three-layer film is attached to a UV-peelable dicing tape (thickness: 180 μm).

Next, the film is cut from the upper cladding layer side by using a dicing saw at predetermined pitches, with the level that is 15 μm lower than the lowermost surface of the three-layer film serving as the standard level, whereby grooves are formed. The pitch between the grooves is 50 μm, and the pitch of the remaining potions was 250 μm.

The PET film is coated with a UV-curable epoxy material by a spin coating process, thereby forming a film of uncured polymer material having a thickness of 7 μm. Subsequently, the film of the uncured polymer material formed on the PET film is attached to the upper cladding layer side of the three-layer film having the grooves, a certain pressure is applied onto the film, and then irradiation with ultraviolet rays is conducted to cure the polymer material film.

Next, the three-layer film is peeled off the dicing tape, the grooves are filled with a UV-curable epoxy material (refractive index: 1.51), and the UV-curable epoxy material is cured by irradiation with ultraviolet rays, so as to form a filler cladding layer.

Finally, a strip having a width of 3 mm and a length of 10 cm is cut out by using the dicing saw, so that a 4-channel polymer optical waveguide having a core diameter of 50 μm and a core pitch of 250 μm is completed.

The obtained optical waveguide is bent at the angle of 360 degrees at a radius of 1 mm, and the insertion loss of the optical waveguide is measured. The observed insertion loss is 1.1 dB.

Example 2

In the same manner as in Example 1, a two-layer film including a core layer and a cladding layer is prepared such that the numerical aperture (NA) is 0.4, and the cladding layer side of the two-layer film is attached to a dicing tape. Thereafter, the film is cut into in the thickness direction from the core layer side by using a dicing saw, thereby forming grooves. Subsequently, a PET film is coated with an acrylic polymer material by a spin coating process, thereby forming a film having a thickness of 7 μm. The film is irradiated with ultraviolet rays in an air atmosphere, and incompletely cured.

Then, the PET film having the film of the incompletely cured polymer material is attached to the core layer side of the two-layer film, and the polymer material is cured by ultraviolet rays in a nitrogen atmosphere. As a result, the uncured layer is cured in a state in which a part of the uncured layer covers the upper surface of the core and the remaining part of the uncured layer covers the side surface of the core.

Subsequently, the two-layer film is peeled off the PET film and the dicing tape, and a cladding material is filled in the grooves and cured. Finally, the external shape of the film is formed by the dicing saw, so that a 4-channel polymer optical waveguide having a width of 3 mm, a length of 10 cm, a core size of 50 µm, and a core pitch of 250 µm is completed.

The optical waveguide is bent at an angle of 360 degrees at a radius of 1 mm, and an insertion loss is measured. The observed insertion loss is 1.1 dB.

The present invention is not limited to the aforementioned exemplary embodiments and examples, and appropriate modifications may be added thereto.

For example, the numbers of the core layers and the cladding layers are not limited as long as these layers are alternately disposed.

Further, a cutting tool for the layered film is not limited to the dicing blade, and other cutting tools may also be used.

Still further, the configuration of the curable resin layer on the transfer base material is not limited as long as it maintains the core spacing after cutting of the layered film, and it is not essential for a part of the curable resin to enter the grooves of the layered film.

What is claimed is:

1. A method for manufacturing an optical waveguide, comprising:
   (A) temporarily affixing one side of a layered film including alternate layers of a core layer and a cladding layer to a cutting base material, and cutting the layered film in a thickness direction from a side of the layered film opposite to the cutting base material so as to form a groove that penetrates through the layered film but does not penetrate through the cutting base material and a plurality of core portions;
   (B) attaching a transfer base material provided with an uncured curable resin layer to a surface of the cut layered film at the side opposite to the one side affixed to the cutting base material with the curable resin layer disposed between the transfer base material and the surface of the cut layered film;
   (C) curing the curable resin layer in order to peel the cut layered film from the cutting base material while maintaining spacing between the plurality of core portions, and in order to transfer the cut layered film to the transfer base material; and
   (D) enclosing with a cladding material the plurality of core portions, the spacing being maintained by the cured resin layer.

2. The method for manufacturing an optical waveguide according to claim 1, wherein a thickness of the curable resin layer provided on the transfer base material is about 10 µm or less.

3. The method for manufacturing an optical waveguide according to claim 1, wherein the curable resin layer is retained as a part of the cladding that encloses the core portions.

4. The method for manufacturing an optical waveguide according to claim 1, wherein the transfer base material is retained in the optical waveguide.

5. The method for manufacturing an optical waveguide according to claim 1, wherein the cutting base material and the transfer base material are peelable by UV exposure.

6. The method for manufacturing an optical waveguide according to claim 1, wherein the curable resin layer is in a incompletely cured state when being attached to the layered film.

7. The method for manufacturing an optical waveguide according to claim 1, wherein a thickness of the cladding layer is about 30 µm or less.

8. The method for manufacturing an optical waveguide according to claim 1, wherein a thickness of the layered film is from about 70 µm to about 150 µm.

9. The method for manufacturing an optical waveguide according to claim 1, wherein a thickness of the transfer base material is from about 10 to about 200 µm.

10. The method for manufacturing an optical waveguide according to claim 1, wherein the curable resin layer includes a UV-curable resin.

* * * * *